United States Patent [19]
Cho

[11] Patent Number: 6,058,213
[45] Date of Patent: May 2, 2000

[54] METHOD AND APPARATUS FOR ENCODING A BINARY SHAPE SIGNAL

[75] Inventor: Sung-Ryul Cho, Seoul, Rep. of Korea

[73] Assignee: Daewoo Electronics Co., Ltd., Rep. of Korea

[21] Appl. No.: 09/067,502

[22] Filed: Apr. 27, 1998

[30] Foreign Application Priority Data

Sep. 26, 1997 [KR] Rep. of Korea ................ 97-49176

[51] Int. Cl.[7] .............................. G06K 9/36; G06K 9/46
[52] U.S. Cl. ...................... 382/239; 382/236; 382/243
[58] Field of Search .................... 382/237, 239, 382/238, 236, 232, 243, 247, 244, 268; 358/261.2; 341/51, 107

[56] References Cited

U.S. PATENT DOCUMENTS

| | | | |
|---|---|---|---|
| 5,455,874 | 10/1995 | Ormsby et al. | 382/251 |
| 5,745,603 | 4/1998 | Rust | 382/229 |
| 5,815,097 | 9/1998 | Schwartz et al. | 341/51 |
| 6,005,980 | 12/1999 | Eifrig et al. | 382/236 |

FOREIGN PATENT DOCUMENTS 0279419  8/1988  European Pat. Off. ......... H04N 1/40

*Primary Examiner*—Thomas D. Lee
*Assistant Examiner*—Wenpeng Chen
*Attorney, Agent, or Firm*—Anderson Kill & Olick

[57] ABSTRACT

An apparatus, for use in a context-based arithmetic encoding of a binary shape signal, generates a bordered block having a border of width D around a target block based on the binary shape signal which includes a plurality of blocks of P×Q pixels having one of a larger and a smaller binary values, P and Q being positive integers, respectively, and the target block is one of the blocks of P×Q pixels. In order to produce the bordered block, the apparatus first calculates a weighted mean for each of the border pixels in the bordered block by using N number of neighboring pixels, N being a positive integer. Each of the weighted means is compared with the larger binary value to thereby assign either the larger or the smaller binary value to each of the border pixels. After the binary value to be assigned to each of the border pixels is determined, the apparatus constructs the bordered block based on the binary values assigned to the border pixels and the binary shape signal.

16 Claims, 8 Drawing Sheets

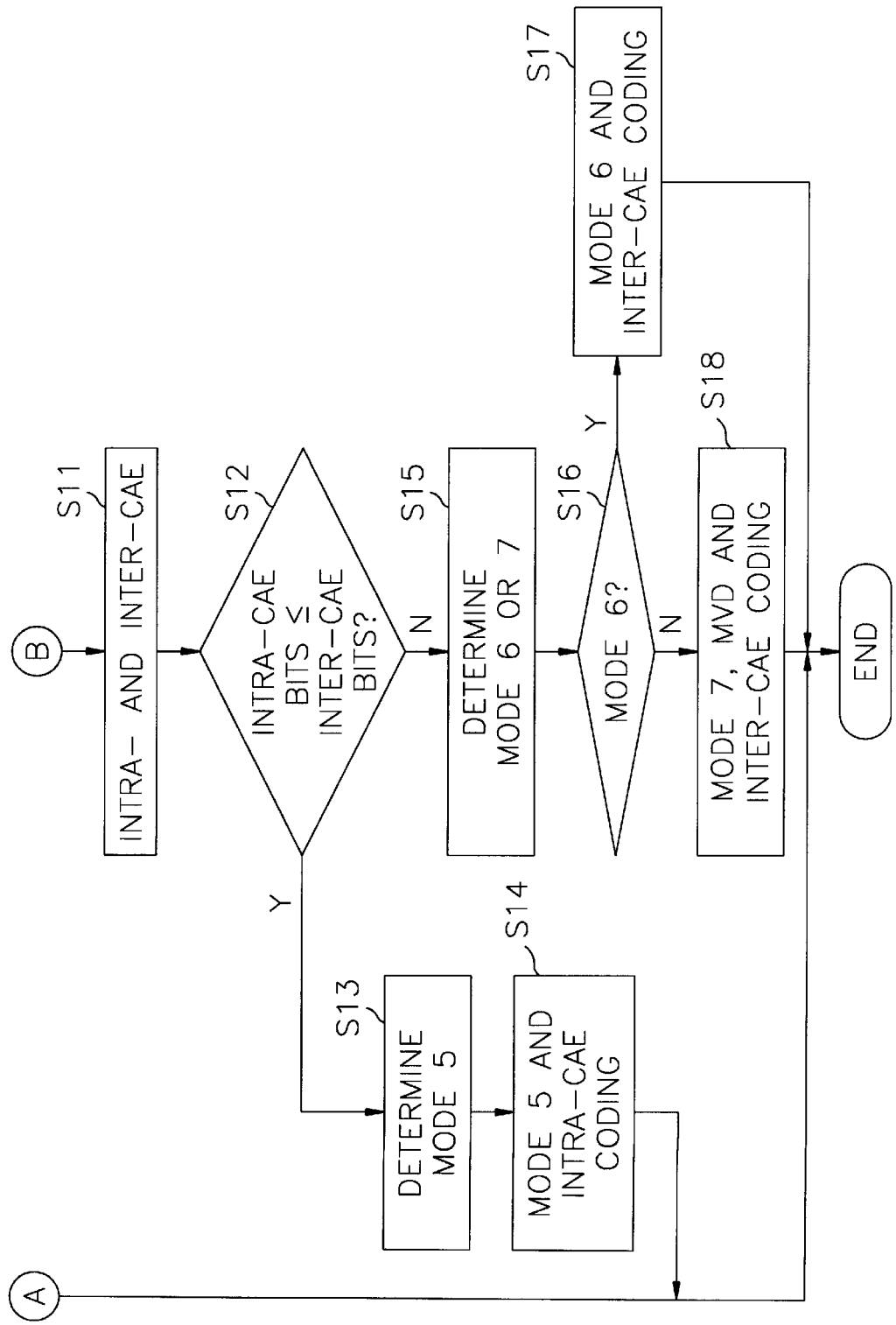

ALIGNMENT

METHOD AND APPARATUS FOR ENCODING A BINARY SHAPE SIGNAL

FIELD OF THE INVENTION

The present invention relates to a method and an apparatus for coding a binary shape signal; and, more particularly, to a method and an apparatus for generating a bordered block to be used in a context-based arithmetic encoding by employing a weighted mean calculation technique.

DESCRIPTION OF THE PRIOR ART

A binary shape signal, representing the location and shape of an object, can be expressed as a binary alpha block(BAB) of, e.g., 16×16, binary pixels within a frame(or VOP), wherein each binary pixel has a binary value, e.g., 0 or 255, representing either a background pixel or an object pixel. A BAB can be encoded by using a conventional bit-map-based shape coding method such as a context-based arithmetic encoding(CAE) method.

For instance, for an intra-frame, a current BAB is encoded by using a conventional intra-CAE technique, wherein each pixel in the current BAB is arithmetically coded based on an intra-context comprised of a set of pixels selected from a current frame. In other words, when encoding the current BAB, pixels from neighboring BAB's are used to make up the intra-context. A border of width 2 around the current BAB is used in order to provide a current bordered BAB as depicted in FIG. 6. In FIG. 6, the pixels in the light area of the current bordered BAB are the part of the current BAB to be encoded and the pixels in the dark area of the current bordered BAB are the border pixels. These are obtained from the neighboring BAB's of the current BAB except for those marked '0' which are unknown at a decoding time. Based on the current bordered BAB, the intra-context is selected as shown in FIG. 5A. Therefore, in FIG. 5A, a shaded pixel, i.e., a pixel in the current BAB, is encoded by using its intra-context comprised of, e.g., C0 to C9.

For an inter-frame, the current BAB may be coded by using either the intra-CAE or an inter-CAE technique depending on whichever CAE technique between the two generates a less amount of encoded data. According to the inter-CAE technique, an error representing a difference between the current BAB and each of predetermined candidate BAB's thereof included in a previous frame is calculated first and a most similar candidate BAB and a motion vector are found by a motion estimation technique, wherein the most similar candidate BAB represents a candidate BAB generating a least error among the candidate BAB's, wherein the motion vector denotes a displacement between the current BAB and the most similar candidate BAB. Thereafter, each pixel in the current BAB is arithmetically coded based on an inter-context; and a motion vector difference (MVD) which represents a difference between the motion vector and a motion vector predictor (MVP) thereof is encoded by using, e.g., a variable length coding (VLC) scheme. Referring to FIG. 5B, the inter-context is composed of two subsets of pixels: a first subset of pixels, e.g., C0 to C3, being selected from pixels in the current frame in a similar manner that is used in the intra-CAE; and a second subset of pixels, e.g., C4 to C8, being chosen from the previous frame based on the motion vector. Namely, a border of width 1 around a motion compensated BAB, detected from the previous frame by using the motion vector, is utilized to supply a bordered motion compensated BAB as described in FIG. 7, wherein the light area corresponds to the motion compensated BAB and the dark area corresponds to the border. After the bordered motion compensated BAB is determined, the second subset of pixels containing the binary pixels C4 to C8 is selected from the bordered motion compensated BAB.

Accordingly, either the intra-context or the inter-context is selected as illustrated above and a context number for each of the pixels in the current BAB is calculated based on its corresponding context. Once the context number for each of the pixels in the current BAB is ciphered, a probability corresponding to the context number is detected from a probability table containing predetermined probabilities assigned to various context numbers and the detected probability is arithmetically encoded to thereby produce an encoded binary shape signal. For further details of the CAE techniques and the MVD, reference may be made to MPEG-4 Video Verification Model Version 7.0, International Organization for Standardization, Coding of Moving Pictures and Associated Audio Information, ISO/IEC JTC1/SC29/WG11

MPEG97/N1642, Bristol, April 1997.

In order to further enhance the coding efficiency of the binary shape signal, one of the mode signals listed in Table 1 is assigned for each BAB.

TABLE 1

| Coding Modes | |
| --- | --- |
| mode 1 | MVD==0 && No Update |
| mode 2 | MVD!=0 && No Update |
| mode 3 | all 0 |
| mode 4 | all 255 |
| mode 5 | intra-CAE |
| mode 6 | MVD==0 && inter-CAE |
| mode 7 | MVD!=0 && inter-CAE |

Mode 1 represents that an MVD for a BAB is zero and the BAB can be represented by a most similar candidate BAB thereof, whereas mode 2 indicates that an MVD for a BAB has a value other than zero and the BAB can be represented by a most similar candidate BAB. For the BAB of mode 1 only, the mode signal is encoded; and the BAB of mode 2 is represented by the mode signal and the MVD thereof. In determining "No Update", a difference BAB is formed by a difference between each pixel of the most similar BAB and a corresponding pixel thereof in the current BAB; and it is checked whether an error of any of the 4×4 subblocks of 4×4 pixels included in the difference BAB is less than a predetermined threshold, said error of a subblock being, e.g., a sum of absolute pixel values within the subblock. If error values of all the subblocks are equal to or less than the predetermined threshold, the BAB is declared as of mode 1 or 2 depending on the value of the MVD thereof.

Similarly, if an error for any 4×4 subblock is equal to or less than the predetermined threshold when the pixels in a BAB are all changed to 0, the BAB is coded as an "all_0" mode, i.e., mode 3. If the error for any 4×4 subblock is equal to or less than the threshold when the pixels in a BAB are all changed to 255, the BAB is coded as an all_255 mode, i.e., mode 4. For a BAB of mode 3 or 4, only the mode signal is encoded for the BAB. When a BAB does not belong to any one of modes 1 to 4, "intra-CAE" or "inter-CAE" is employed for the coding of the BAB, wherein a BAB of mode 5 is represented by the mode signal and intra-CAE coded BAB data. A BAB of mode 6 is represented by the mode signal and inter-CAE coded BAB data; and a BAB of mode 7 is represented by the mode signal, inter-CAE coded BAB data and an MVD.

In MPEG-4, the mode determination scheme described above has been suggested in encoding a binary shape signal; and an exemplary method and apparatus for enabling the coding of the binary shape signal is disclosed in a commonly owned copending application, U.S. Ser. No. 08/984,033, filed on Dec. 2, 1997 and entitled "INTERLACED BINARY SHAPE CODING METHOD AND APPARATUS", now U.S. Pat. No. 5,929,915 published on Jul. 27, 1999.

However, in the conventional CAE techniques which may be used to encode a binary shape signal, the border pixels in the current bordered BAB which are unknown at the time of decoding are determined by a known padding method based on the current BAB; and in that instance, it would be difficult to take into account the correlation between the current pixels neighboring each of the border pixels in determining the border pixels; and, consequently, the coding efficiency may be undermined if improper values are assigned to the border pixels.

SUMMARY OF THE INVENTION

It is, therefore, a primary object of the invention to provide a method and an apparatus for generating a more effective bordered block for use in a CAE method by employing a weighted mean calculation technique.

In accordance with one aspect of the present invention, there is provided a method, for use in a context-based arithmetic encoding of a binary shape signal, for generating a bordered block which has a border of width D around a target block, wherein the binary shape signal includes a plurality of blocks of P×Q pixels having one of a larger and a smaller binary values, P and Q being positive integers, respectively, and the target block is one of the blocks of P×Q pixels, comprising the steps of: (a) computing a weighted mean corresponding to a given border pixel selected among the border pixels in the bordered block by using a number of selected neighboring pixels whose pixel values have been already determined; (b) comparing the weighted mean with the larger binary value to thereby assign either the larger or the smaller binary value to the given border pixel; (c) repeating the steps (a) and (b) until each of the border pixels in the bordered block is assigned with one of the larger and the smaller binary values; and (d) formatting the bordered block based on the binary values assigned to the border pixels and the target block.

In accordance with another aspect of the present invention, there is provided an apparatus, for use in a context-based arithmetic encoding of a binary shape signal, for generating a bordered block which has a border of width D around a target block, wherein the binary shape signal includes a plurality of blocks of P×Q pixels having one of a larger and a smaller binary values, P and Q being positive integers, respectively, and the target block is one of the blocks of P×Q pixels, which comprises: a weighted mean calculation sector for computing a weighted mean corresponding to each of border pixels in the bordered block by using a number of selected neighboring pixels whose pixel values have been already determined; a border pixel determination sector for comparing each of the weighted means with the larger binary value to thereby assign either the larger or the smaller binary value to each of the border pixels; and a bordered block generation sector for formatting the bordered block based on the binary values assigned to the border pixels and the target block.

BRIEF DESCRIPTION OF THE DRAWINGS

The above and other objects and features of the present invention will become apparent from the following description of preferred embodiments given in conjunction with the accompanying drawings, in which:

FIGS. 4A and 4B provide a flow chart showing a binary shape signal coding process;

Figure 6:
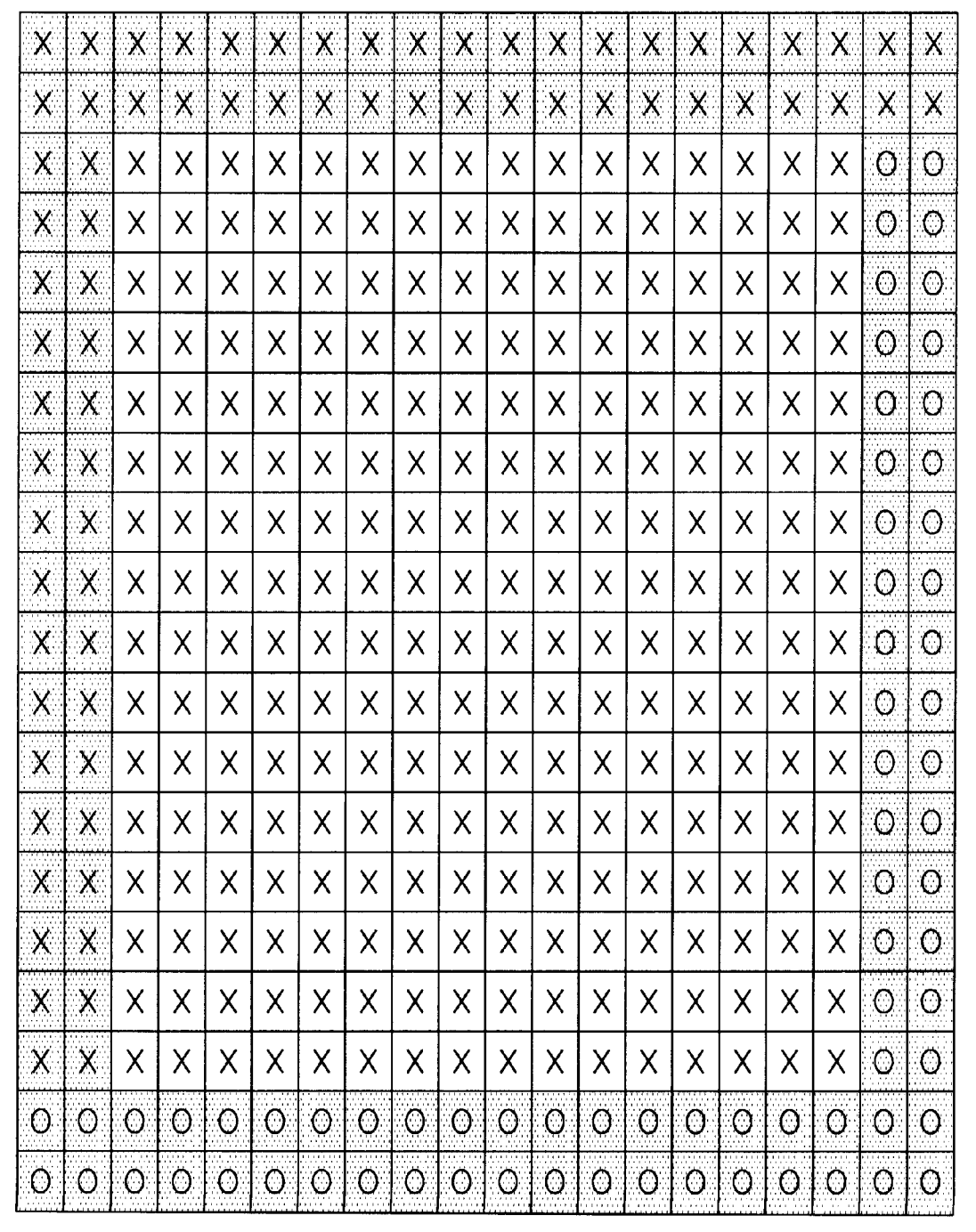

FIG. 6 describes a current bordered BAB; and

Figure 7:
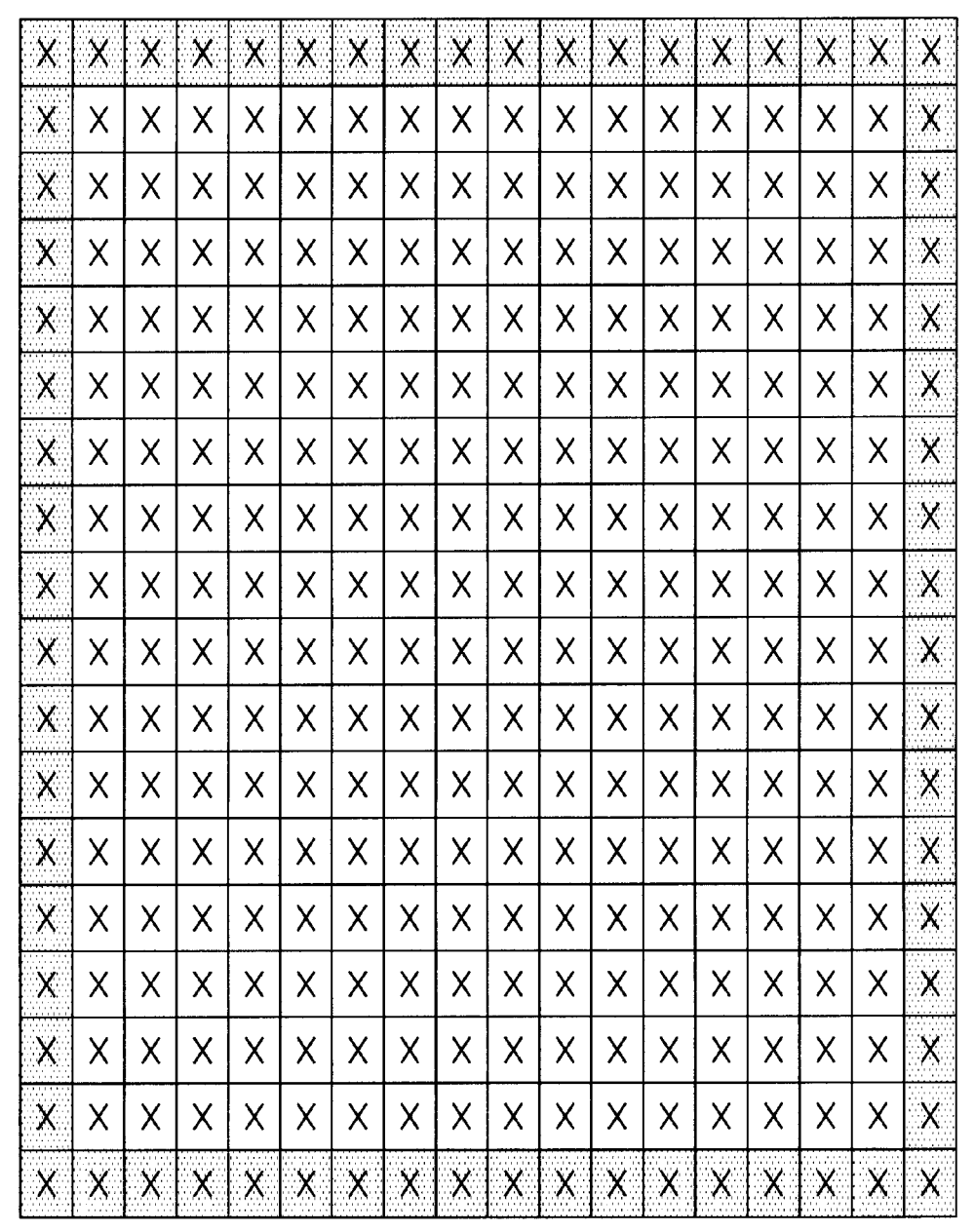

FIG. 7 presents a bordered motion compensated BAB.

DETAILED DESCRIPTION OF THE PREFERRED EMBODIMENTS

In accordance with the present invention, there is provided a method and an apparatus for efficiently encoding a binary shape signal on a picture-by-picture basis. The binary shape signal includes a previous and a current pictures and each picture is partitioned into blocks of P×Q binary pixels with P and Q being positive integers, respectively, wherein each block is referred to as a binary alpha block(BAB). In a preferred embodiment of the invention, P and Q are both set to 16.

Figure 1:
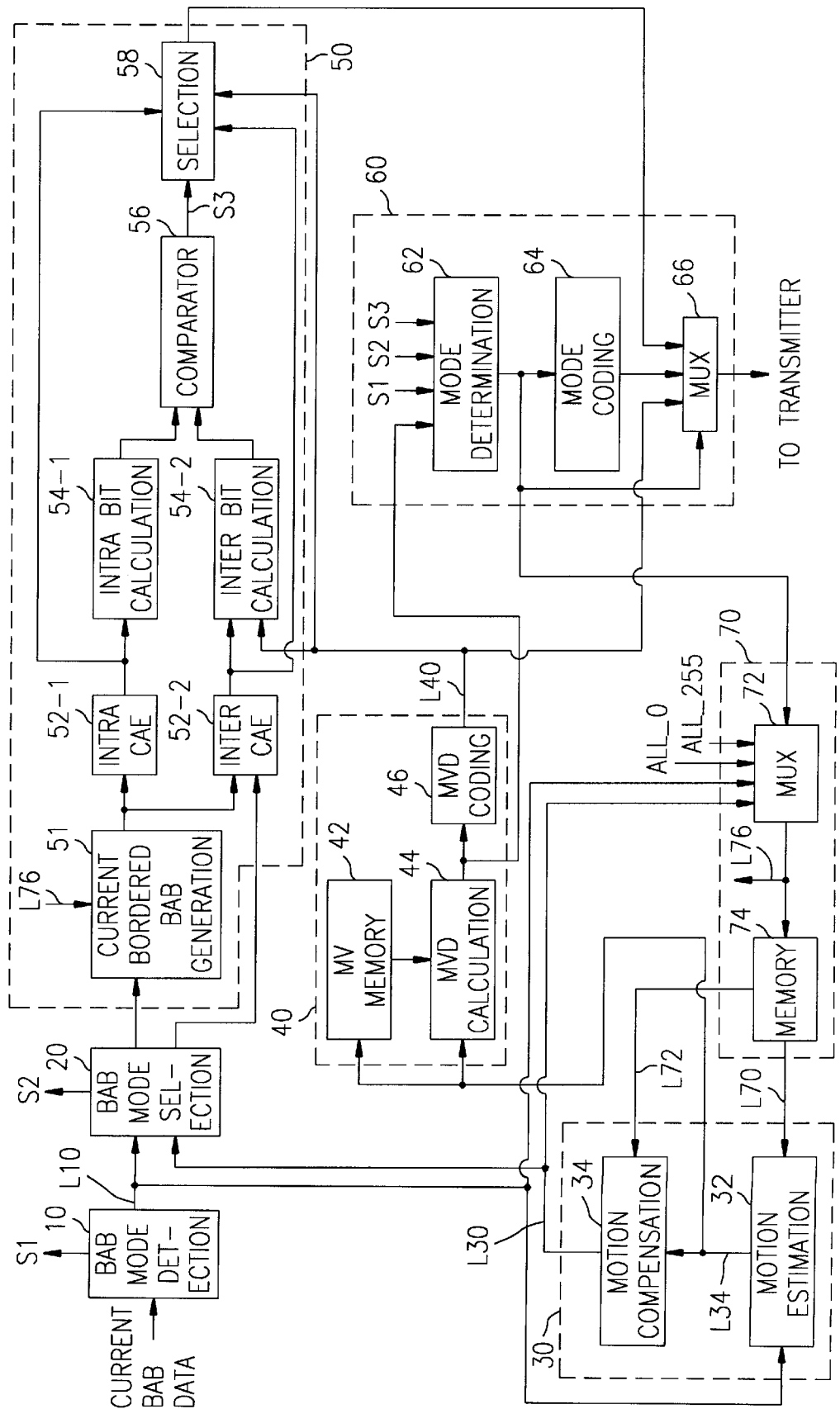
FIG. 1 represents a block diagram of a binary shape signal coding apparatus in accordance with the present invention.

Referring to FIG. 1, a binary shape signal coding apparatus in accordance with the present invention is illustrated. Current BAB data is provided to a BAB mode detection block 10, wherein the current BAB data contains binary pixel data of a current BAB. In binary pixel data, an object and a background pixel are represented by binary numbers, e.g., 255 and 0, respectively.

The BAB mode detection block 10 examines whether a coding mode of the current BAB is "all_0" or "all_255". More specifically, the current BAB is partitioned into sub-blocks of T×S pixels, e.g., 4×4 pixels, T and S being positive integers, respectively, and, therefore, the current BAB of 16×16 pixels includes 4×4 subblocks therein. If an error between any subblock of the current BAB and a subblock of an all_0 BAB is smaller than or equal to a predetermined threshold, an indication signal S1 of type 1 which indicates that the coding mode of the current BAB is "all_0" is provided from the BAB mode detection block 10 to a mode determination block 62 within a formatting unit 60, wherein the all_0 BAB is a BAB in which each pixel value is 0. On the other hand, if an error between any subblock of the current BAB and a subblock of an all 255 BAB is smaller than or equal to the predetermined threshold, an indication signal S 1 of type 2 which indicates that the coding mode of the current BAB is "all_255" is provided from the BAB mode detection block 10 to the mode determination block 62, wherein the all_255 BAB is a BAB each of whose pixel values is 255.

If the coding mode of the current BAB is determined as neither "all_0" nor "all_255", the BAB mode detection block 10 provides the current BAB data to a BAB mode selection block 20, a motion estimation block 32 within a motion estimation and compensation(ME & MC) unit 30, and a first multiplexor(MUX) 72 within a picture reconstruction unit 70 via a line L10. The BAB mode selection block 20 is also provided with bordered motion compensated BAB data from a motion compensation block 34 within the ME & MC unit 30 via a line L30. The motion estimation and compensation process will be described hereinafter.

In a memory 74 within the picture reconstruction unit 70, reconstructed picture data is stored, wherein the reconstructed picture data represents information on the previous picture. The motion estimation block 32 extracts reconstructed previous picture data from the memory 74 via a line L70. The current BAB data is also provided to the motion estimation block 32 from the BAB mode detection block 10 via the line L10. The motion estimation block 32 performs motion estimation of the current BAB with respect to its previous picture and selects, as an optimum candidate BAB or a most similar BAB, a candidate BAB which yields a minimum error. An output from the motion estimation block 32 is a current motion vector on a line L34 leading to a motion vector memory(MV memory) 42 and a motion vector difference(MVD) calculation block 44 within a motion vector difference determination unit 40 and the motion compensation block 34, wherein the current motion vector denotes a displacement between the current BAB and the optimum candidate BAB.

The motion compensation unit 34 extracts bordered BAB data from the memory 74 via a line L72, wherein the bordered BAB data represents pixel data on the optimum candidate BAB and a border of width 1 pixel therearound; and provides the bordered BAB data as the bordered motion compensated BAB data to the BAB mode selection block 20 and the first MUX 72 via the line L30.

The MVD calculation block 44, responsive to the current motion vector from the motion estimation block 32 on the line L34, extracts a motion vector predictor from the MV memory 42, wherein the motion vector predictor is a motion vector of one of preset neighboring BAB's of the current BAB determined according to MPEG-4 supra. Then a motion vector difference(MVD) between the current motion vector and the corresponding motion vector predictor is calculated. The MVD is provided to an MVD coding block 46 in the motion vector difference determination unit 40 and the mode determination block 62 within the formatting unit 60.

If and only if the MVD has a value other than zero, the MVD coding block 46 encodes the MVD and provides the encoded MVD to an inter bit calculation block 54-2, a selection block 58 within a context based arithmetic encoding (CAE) unit 50 and a second multiplexor(MUX) 66 within the formatting unit 60 via a line L40, wherein the CAE unit 50 includes a current bordered BAB generation block 51, an intra-CAE and an inter-CAE blocks 52-1 and 52-2, an intra-bit and the inter-bit calculation blocks 54-1 and 54-2, a comparator 56 and the selection block 58.

Meantime, in response to the current BAB data on the line L10 and the bordered motion compensated BAB data on the line L30, the BAB mode selection block 20 divides the current BAB and the optimum candidate BAB included in the bordered motion compensated BAB into subblocks of 4×4 pixels. If an error between any of the subblocks within the current BAB and its corresponding subblock within the optimum candidate BAB is smaller than or equal to the predetermined threshold, the BAB mode selection block 20 generates an indication signal S2, which indicates that the current BAB need not be encoded, and provides same to the mode determination block 62.

If any of the errors between the respective subblocks in the current BAB and their corresponding subblocks in the optimum candidate BAB is greater than the predetermined threshold, the BAB mode selection block 20 provides the current BAB data to the current bordered BAB generation block 51 and the bordered motion compensated BAB data to the inter-CAE block 52-2.

Figure 2:
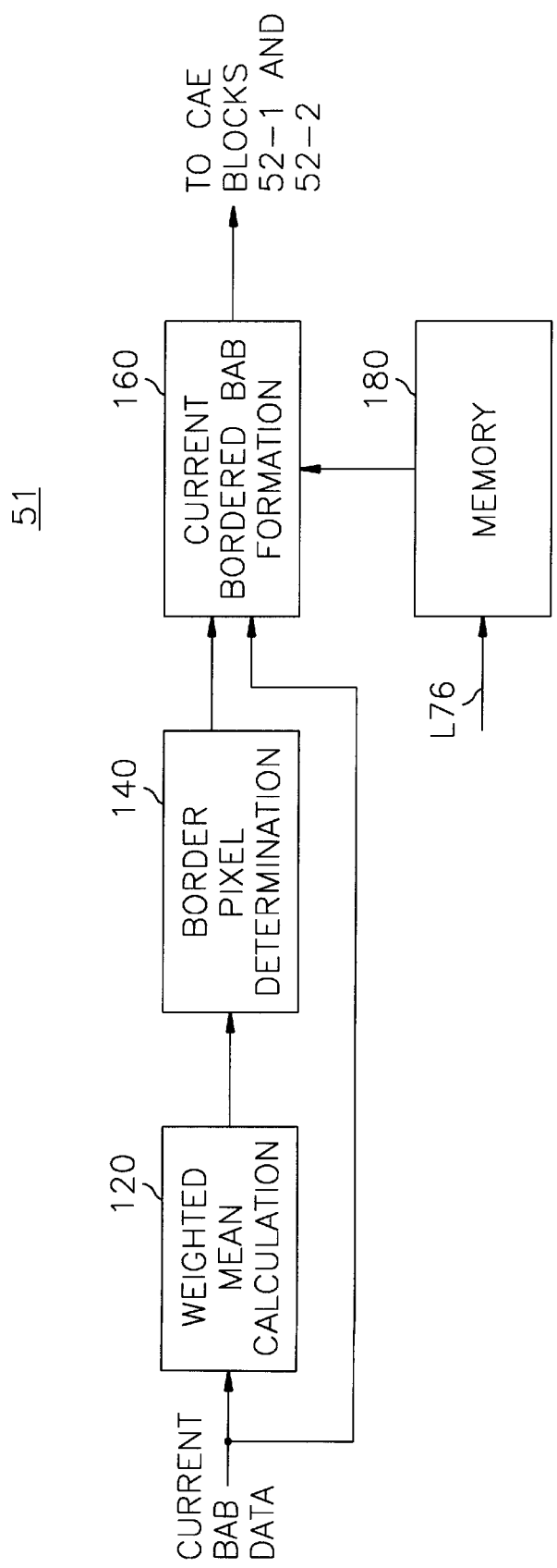
FIG. 2 shows a detailed block diagram of a current bordered BAB generation block in FIG. 1.

Referring to FIG. 2, there is shown the current bordered BAB generation block 51 which contains a weighted mean calculation sector 120, a border pixel determination sector 140, a current bordered BAB formation sector 160 and a memory 180. The current bordered BAB generation block 51 produces a current bordered BAB of the current BAB by using a weighted mean calculation technique.

The current BAB data derived from the BAB mode selection block 20 is fed to the weighted mean calculation sector 120 and the current bordered BAB formation sector 160 in parallel. Hereinafter, the current bordered BAB generation process will be described with reference to FIG. 3.

Figure 3:
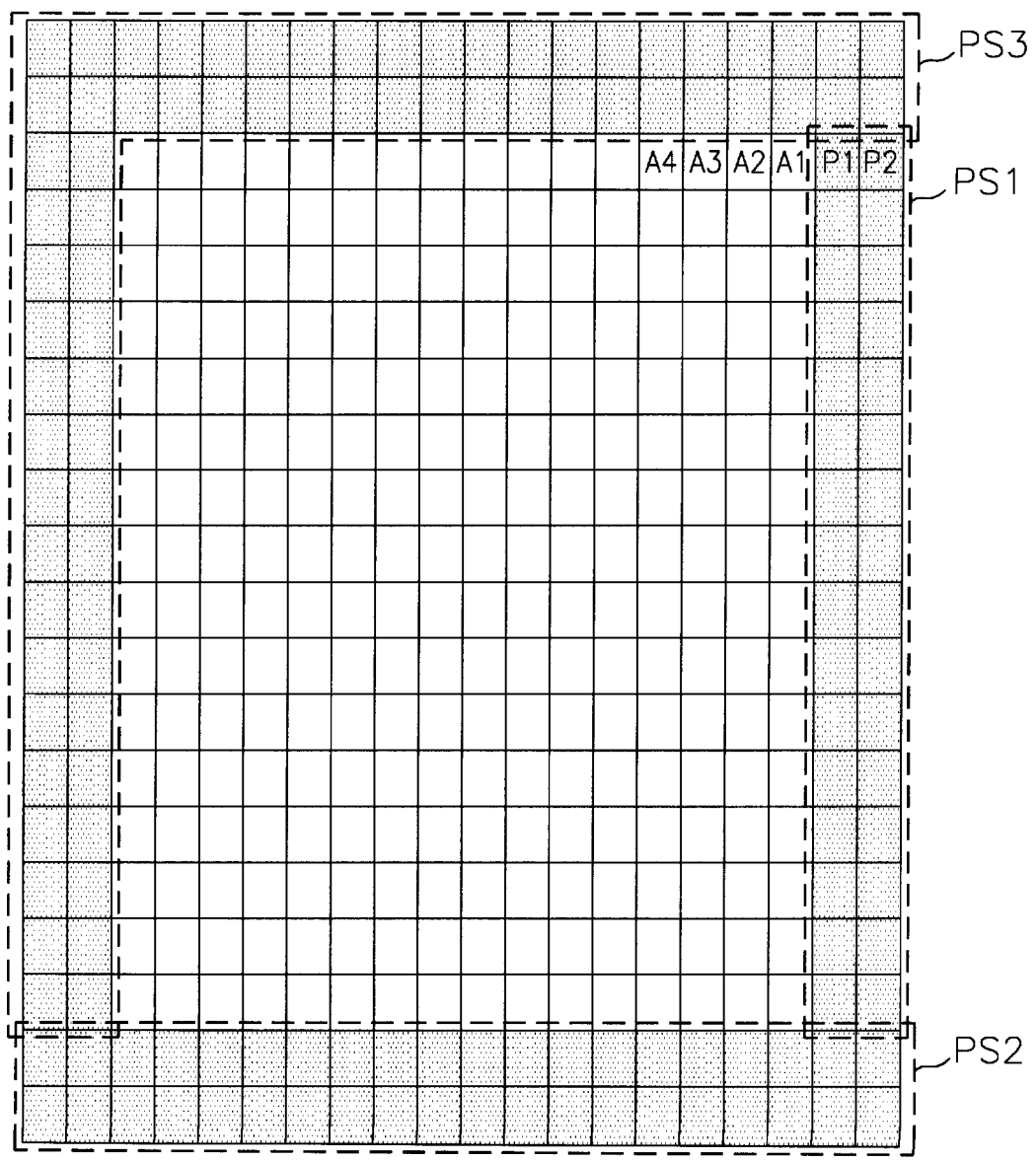
FIG. 3 illustrates a bordered BAB formation process in accordance with the present invention.

As illustrated in the prior art, a border of width D, e.g., 2, around the current BAB is used as depicted in FIG. 3 in order to provide the current bordered BAB. In FIG. 3, the pixels in the light area of the current bordered BAB are the part of the current BAB to be encoded and the pixels in the dark area of the current bordered BAB are the border pixels. Among the border pixels in the dark area, upper and left-side border pixels, i.e., pixels in a reference border region PS3, are obtained from neighboring BAB's of the current BAB and the border pixels in a first and a second prediction border regions PS1 and PS2 are unknown. Therefore, in order to encode each pixel in the current BAB in the next circuits based on a corresponding intra-context or inter-context, the border pixels in the first prediction border region PS1 should have proper pixel values.

For assigning the proper pixel values to the border pixels in the first prediction border region PS1, first of all, the weighted mean calculation sector 120 ciphers weighted means corresponding to the border pixels in the first prediction border region PS1. In accordance with an embodiment of the present invention, as shown in FIG. 3, each border pixel in the first prediction border region PS1 is determined by using its N, e.g., 4, selected neighboring pixels located at its left-side as follows:

$$WM_i = \frac{1}{N}\sum_{k=1}^{N} C_k \times W_k \qquad \text{EQ. 1}$$

wherein $WM_i$ represents a weighted mean of an ith border pixel in the first prediction border region PS1, i being a positive integer ranging from 1 to M and M being a positive integer representing the total number of the border pixels in the first prediction border regions PS1; $C_k$ is a pixel value of a selected neighboring pixel of the ith border pixel, k being a positive integer ranging from 1 to N, N being a positive integer representing the number of the selected neighboring pixels for the ith border pixel; and $W_k$ shows a weight corresponding to the $C_k$.

For instance, as shown in FIG. 3, the border pixel P1 in the first prediction border region PS1 obtains a pixel value by using its neighboring pixels A1 to A4 and the border pixel P2 has a pixel value derived from its neighboring pixels P1 and A1 to A3.

In EQ. 1, the weight corresponding to each of the N selected neighboring pixels is different from one another. As a selected neighboring pixel is closer to a target border pixel in the first prediction border region PS1, its corresponding weight has a larger value since the closer neighboring pixel has higher correlation with the target border pixel. That is, the weights have values in order of $W_1 > W_2 > \ldots > W_N$, wherein a selected neighboring pixel having a smaller index k is located closer to the target border pixel.

In accordance with an embodiment of the present invention, the weights used to compute the weighted mean are experimentally optimized based on picture data of a predetermined number of previous pictures, e.g., picture data of one previous picture.

The weighted means for all of the border pixels which are calculated by applying EQ. 1 to all of the border pixels in the first prediction border region PS1 are transferred to the border pixel determination sector 140.

The border pixel determination sector 140 compares each of the weighted means derived from the weighted mean calculation sector 120 with a larger binary pixel value of the two binary pixel values. As results of the comparison process, if a weighted mean is smaller than or equal to one third of the larger binary pixel value, a smaller binary pixel value of the two binary pixel values is assigned to its corresponding border pixel. If a weighted mean is larger than or equal to two thirds of the larger binary pixel value, the larger binary pixel value is assigned to its corresponding border pixel. On the other hand, if a weighted mean is larger than one third of the larger binary pixel value and smaller than two thirds of the larger binary pixel value, a pixel value of a selected neighboring pixel closest to a corresponding border pixel is assigned to the corresponding border pixel as well as in the conventional CAE technique. The binary pixel values assigned to all of the border pixels in the first prediction border region PS1 are provided to the current bordered BAB formation sector 160.

When the binary pixel values of the border pixels in the first prediction border region PS1, the current BAB data and neighboring BAB data of the current BAB are coupled thereto from the border pixel determination sector 140, the BAB mode selection block 20 and the memory 180 which stores BAB data of previously reconstructed BAB's positioned around the current BAB fed on a line L76 from the first MUX 72 in FIG. 1, respectively, the current bordered BAB formation sector 160 produces the current bordered BAB by using the above input data. As can be seen above, among the border pixels in the dark area of the current bordered BAB in FIG. 3, the border pixels in the reference border region PS3 are obtained from the neighboring BAB's of the current BAB; the border pixels in the first prediction border region PS1 are determined from the binary pixel values derived from the border pixel determination sector 140; and the border pixels in the second prediction border region PS2 are obtained by using the known padding method or are determined to have the smaller binary pixel values. The current bordered BAB data obtained as above is fed to the intra-CAE and the inter-CAE blocks 52-1 and 52-2.

Referring back to FIG. 1, the intra-CAE block 52-1 generates an intra-context for each pixel in the current BAB based on the current bordered BAB data coupled thereto from the current bordered BAB formation sector 160 in FIG. 2; and encodes the current BAB by using the conventional intra-CAE technique based on the generated intra-context. The intra-CAE data for the current BAB is provided to the intra-bit calculation block 54-1 and the selection block 58.

The intra-bit calculation block 54-1 calculates the number of bits of the intra-CAE data and provides the calculated number of bits to the comparator 56.

Meanwhile, the inter-CAE block 52-2 generates an inter-context for each pixel in the current BAB based on the current bordered BAB data coupled thereto from the current bordered BAB formation sector 160 and the bordered motion compensated BAB data from the BAB mode selection block 20; and encodes the current BAB based on the conventional inter-CAE technique.

The inter-CAE data for the current BAB is fed to the inter-bit calculation block 54-2 and the selection block 58.

The inter bit calculation block 54-2, responsive to the encoded MVD data on the line L40 and the inter-CAE data from the inter-CAE block 52-2, calculates the number of combined bits of the encoded MVD data and the inter-CAE data and provides the calculated number of bits to the comparator 56.

The comparator 56 compares the number of bits of the intra-CAE data with the number of combined bits of the inter-CAE data and the encoded MVD data. If the number of bits of the intra-CAE data is equal to or smaller than the number of combined bits of the inter-CAE data and the encoded MVD data, the comparator 56 provides an indication signal S3 of type 3 to the selection block 58 and the mode determination block 62; and if otherwise, the comparator 56 provides an indication signal S3 of type 4 to the selection block 58 and the mode determination block 62.

The selection block 58 selects either the intra-CAE data or the inter-CAE data and the encoded MVD data in response to the indication signal S3 of type 3 or 4 to thereby provide the selected result to the second MUX 66 in the formatting unit The mode determination block 62 determines the coding mode of the current BAB based on the indication signals S1, S2, S3, and the MVD from the BAB mode detection block 10, the BAB mode selection block 20, the comparator 56 and the MVD calculation block 44, respectively, and provides a determined mode signal to a mode coding block 64, the second MUX 66 within the formatting unit 60 and the first MUX 72. Table 2 shows how to determine the coding mode of the current BAB in accordance with the present invention.

Specifically, mode 1 is determined for the current BAB when S2 exists and MVD=0; mode 2, when S2 exists and MVD≠0; mode 3, when S1 of type 1 exists; mode 4, when S1 of type 2 exists; mode 5, when S3 of type 3 exists regardless of the value of MVD; mode 6, when S3 of type 4 exists and MVD=0; and mode 7, when S3 of type 4 exists and MVD≠0, wherein a reference mark "x" represents that the corresponding signal is not available.

TABLE 2

| Determination of Coding Modes | | | | |
| --- | --- | --- | --- | --- |
| S1 | S2 | S3 | MVD | mode |
| x | ○ | x | = 0 | mode 1 |
| x | ○ | x | ≠ 0 | mode 2 |
| type 1 | x | x | x | mode 3 |
| type 2 | x | x | x | mode 4 |
| x | x | type 3 | = 0 or ≠ 0 | mode 5 |
| x | x | type 4 | = 0 | mode 6 |
| x | x | type 4 | ≠ 0 | mode 7 |

The first MUX 72 reconstructs BAB data corresponding to the current BAB in response to the mode signal from the mode determination block 62. In other words, the first MUX 72 provides the all_0 BAB to the memory 74 via the line L76 in response to the mode 3 signal; the all_255 BAB, in response to the mode 4 signal; the current BAB in response to the mode 5, 6, or 7 signal; and the optimum candidate BAB in response to the mode 1 or 2 signal.

The mode coding block 64 encodes the mode signal from the mode determination block 62, e.g., through the use of a conventional VLC technique and provides the encoded mode signal to the second MUX 66.

In response to the mode signal from the mode determination block 62, the second MUX 66 selectively multiplexes the signals inputted thereto and provides the multiplexed signal as encoded current BAB data to a transmitter(not shown) for the transmission thereof. The encoded current BAB data is the encoded mode signal and the encoded MVD data in case of the mode 1 or 2 signals; the encoded mode signals only in case of the mode 3 or 4 signals; the intra-CAE data in case of the mode 5 signal; and the encoded mode signal, the inter-CAB data and the encoded MVD data in case of the mode 6 or 7 signal.

Figure 4A:
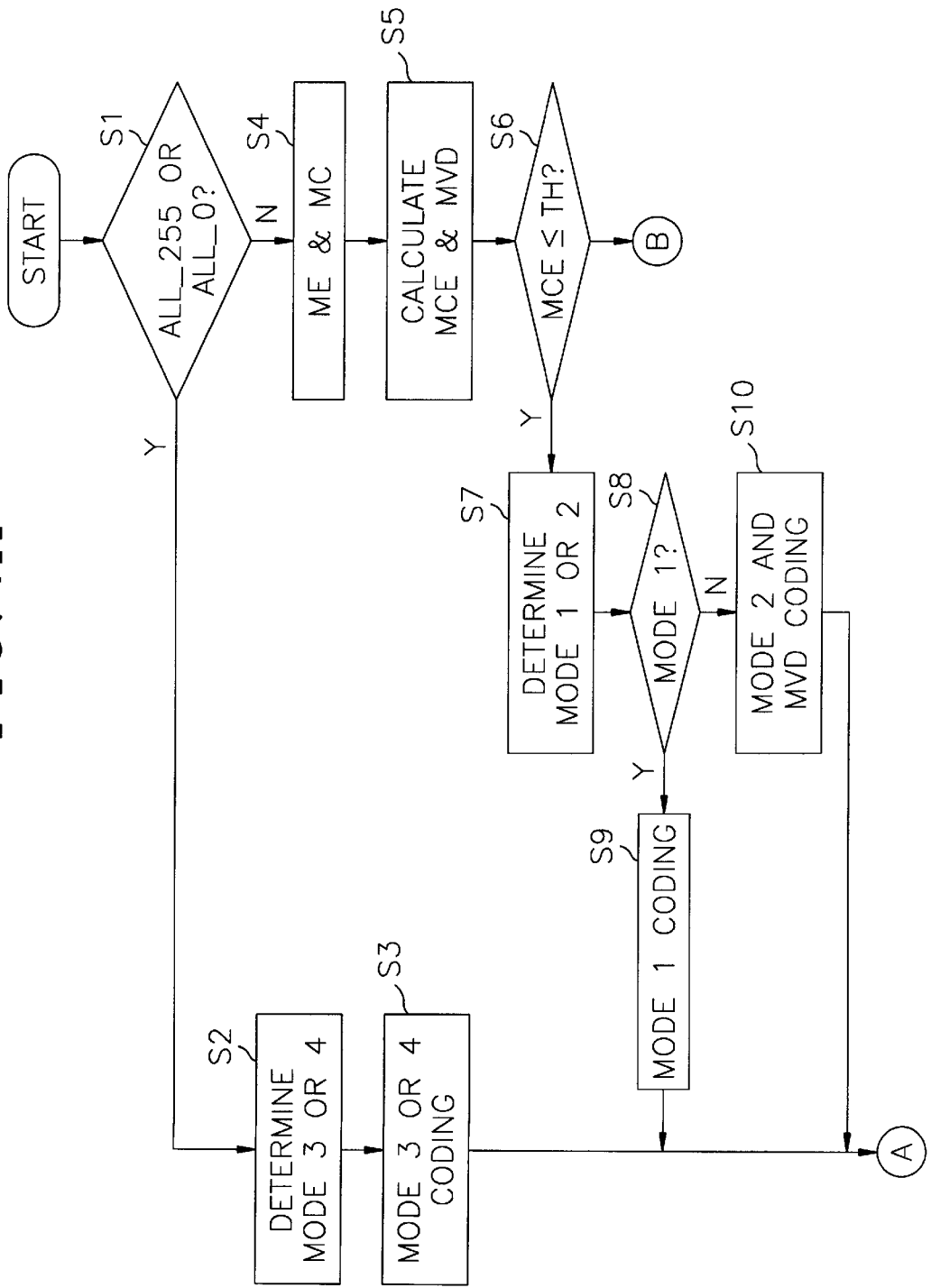
Figure 5A:
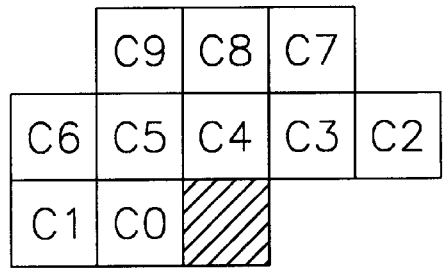
FIGS. 5A and 5B exemplify an intra context and an inter context, respectively.
Figure 5B:
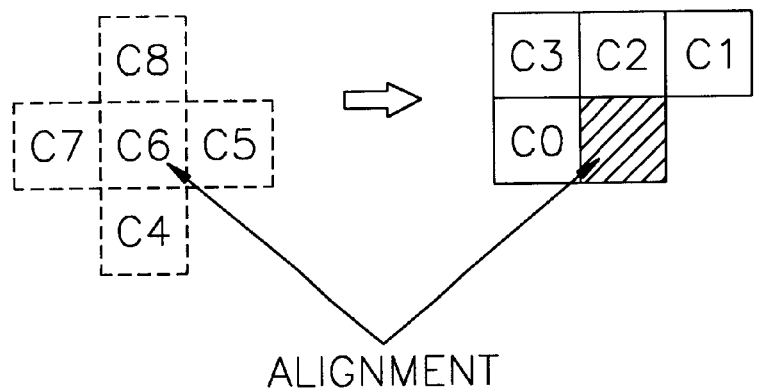

Referring to FIGS. 4A and 4B, there is illustrated a procedure of encoding the binary shape signal in accordance with the present invention. At step S1, it is checked whether or not the pixels in a current BAB can be replaced by all 255's or all 0's. If the check is affirmative and then, at step S2, a mode of the current BAB is determined as the mode 3 if all the pixels in the current BAD can be represented by 0's; and the mode 4, if all the pixels in the current BAB are represented by 255's, as done at the BAB mode detection block 10 shown in FIG. 1. If the mode of the current BAB is determined to be the mode 3 or 4, the mode signal is encoded at step S3 and the procedure terminates by transmitting the encoded mode signal.

If the check result is negative at step S1, the procedure proceeds to step S4, wherein the motion estimation and compensation for the current BAB is performed in the ME & MC unit 30 in FIG. 1 to thereby generate a bordered motion compensated BAB and a current motion vector. At step S5, a motion compensation error (MCE) and a MVD are calculated at the BAB mode selection block 20, wherein the MCE represents an error between the current BAB and an optimum candidate BAB included in the bordered motion compensated BAB.

At step S6, the MCE is compared with a predetermined threshold(TH); and if the MCE is equal to or smaller than the TH, the procedure goes to step S7. At step S7, a mode of the current BAB is determined as the mode 1 if the MVD is zero and as the mode 2 if otherwise. At step S8, it is examined whether the mode of the current BAB is the mode 1 or 2. If it is found that the mode 1 has been assigned to the current BAB, the mode 1 signal is encoded at step S9 and the procedure terminates. If a mode of the current BAB is found to be the mode 2, the mode 2 signal and the MVD are encoded at step S10 and the procedure terminates by transmitting the encoded data.

Referring to step S6, if it is decided the MCE is greater than the TH, the procedure goes to step S11 via a node B. At step S11, the current BAB is encoded by the intra-CAE and the inter-CAE coding schemes and the number of bits corresponding to the intra-CAE data and the one for the inter-CAE data are generated, as described with reference to the intra-CAE and inter-CAE blocks 52-1 and 52-2 and the intra-bit calculation and inter-bit calculation blocks 54-1 and 54-2 shown in FIG. 1. If it is determined at step S12 that the number of intra-CAE bits is equal to or smaller than the number of inter-CAE bits, the procedure goes to step S13 and to step S15 if otherwise.

At step S13, the mode of the current BAB is set to be the mode 5 and at step S14, the mode 5 signal is encoded and the procedure terminates by transmitting the encoded mode signal and the intra-CAE data. At step S15, the mode of the current BAB is determined as the mode 6 if the MVD equals to zero and the mode 7 if otherwise, and the procedure proceeds to step S16. At step S16, it is checked whether the mode is 6 or not. If the mode is determined as 6 at step S16, the mode 6 signal is encoded and transmitted together with the inter-CAE data at step S17 and the procedure terminates. On the other hand, if it is found that the mode of the current BAB is the mode 7, the procedure goes to step S18. Finally at step S18, the mode 7 signal and the MVD are encoded and transmitted along with the inter-CAE data to the transmitter and the procedure terminates.

The present invention has been described with reference to the coding of a binary shape signal on a picture-by-picture basis and the picture can be a frame or a field. Therefore, the same scheme can be extended in coding the binary shape signal on a frame or a field basis. In such an instance, a motion estimation and compensation process would be carried out with reference to a previous frame or preceding fields. Also, the current bordered BAB generation process can be used as well for the case when the current BAB is transposed according to MPEG-4 supra.

While the present invention has been described with respect to certain preferred embodiments only, other modifications and variations may be made without departing from the spirit and scope of the present invention as set forth in the following claims.

What is claimed is:

1. A method, for use in a context-based arithmetic encoding of a binary shape signal, for generating a bordered block which has a border of width D around a target block, wherein the binary shape signal includes a plurality of blocks of P×Q pixels having one of a larger and a smaller binary values, P and Q being positive integers, respectively, and the target block is one of the blocks of P×Q pixels, comprising the steps of:

(a) computing a weighted mean corresponding to a given border pixel selected among the border pixels in the bordered block by using a number of selected neighboring pixels whose pixel values have been already determined;

(b) comparing the weighted mean with the larger binary value to thereby assign either the larger or the smaller binary value to the given border pixel;

(c) repeating the steps (a) and (b) until each of the border pixels in the bordered block is assigned with one of the binary values; and (d) formatting the bordered block based on the binary values assigned to the border pixels and the target block.

2. The method as recited in claim 1, wherein the weighted mean is calculated as:

$$WM = \frac{1}{N}\sum_{k=1}^{N} C_k \times W_k$$

wherein WM represents the weighted mean of the given border pixel; $C_k$ is a pixel value of a selected neighboring pixel of the given border pixel, k being a positive integer ranging from 1 to N, N being a positive integer and representing the number of the selected neighboring pixels for the given border pixel; and $W_k$ is a weight corresponding to the $C_k$.

3. The method as recited in claim 2, wherein the step (b) includes the steps of:

(b1) comparing the weighted mean with the larger binary value;

(b2) if the weighted mean is smaller than or equal to one third of the larger binary value, assigning the smaller binary value to the given border pixel;

(b3) if the weighted mean is larger than or equal to two thirds of the larger binary value, assigning the larger binary value to the given border pixel; and (b4) if the weighted mean is larger than one third of the larger binary value and smaller than two thirds of the larger binary value, assigning a pixel value of a selected neighboring pixel closest to the given border pixel to the given border pixel.

4. The method as recited in claim 3, wherein the number N is 4.

5. The method as recited in claim 4, wherein the weights corresponding to the selected neighboring pixels are differently determined from one another according to the correlation between each of the selected neighboring pixels and the given border pixel.

6. The method as recited in claim 5, wherein the closer a selected neighboring pixel is to the given border pixel, the larger value its corresponding weight has.

7. The method as recited in claim 6, wherein the weights are empirically optimized based on a previous binary shape signal.

8. The method as recited in claim 7, wherein the number D is 2.

9. An apparatus, for use in a context-based arithmetic encoding of a binary shape signal, for generating a bordered block which has a border of width D around a target block, wherein the binary shape signal includes a plurality of blocks of P×Q pixels having one of a larger and a smaller binary values, P and Q being positive integers, respectively, and the target block is one of the blocks of P×Q pixels, which comprises:

means for calculating a weighted mean corresponding to each of the border pixels in the bordered block by using a number of selected neighboring pixels whose pixel values have been already determined;

means for comparing each of the weighted means with the larger binary value to thereby assign either the larger or the smaller binary value to each of the border pixels; and means for formatting the bordered block based on the binary values assigned to the border pixels and the target block.

10. The apparatus of claim 9, wherein the weighted means are ciphered as:

$$WM_i = \frac{1}{N}\sum_{k=1}^{N} C_k \times W_k$$

wherein $WM_i$ represents a weighted mean of an ith border pixel in the bordered block, i being a positive integer ranging from 1 to M and M representing the total number of the border pixels in the bordered block; $C_k$ is a pixel value of a selected neighboring pixel of the ith border pixel, k being a positive integer ranging from 1 to N, N being a positive integer and representing the number of the selected neighboring pixels for the ith border pixel; and $W_k$ is a weight corresponding to the $C_k$.

11. The apparatus of claim 10, wherein the comparison means includes:

means for comparing each of the weighted means with the larger binary value;

means for, if said each of the weighted means is smaller than or equal to one third of the larger binary value, assigning the smaller binary value to a corresponding border pixel;

means for, if said each of the weighted means is larger than or equal to two thirds of the larger binary value, assigning the larger binary value to the corresponding border pixel; and means for, if said each of the weighted means is larger than one third of the larger binary value and smaller than two thirds of the larger binary value, assigning the pixel value of a selected neighboring pixel closest to the corresponding border pixel.

12. The apparatus of claim 11, wherein the number N is 4.

13. The apparatus of claim 12, wherein the weights corresponding to the selected neighboring pixels are differently determined from one another according to the correlation between each of the selected neighboring pixels and the corresponding border pixel.

14. The apparatus of claim 13, wherein the closer a selected neighboring pixel is to the corresponding border pixel, the larger value its corresponding weight has.

15. The apparatus of claim 14, wherein the weights are empirically optimized based on a previous binary shape signal.

16. The apparatus of claim 15, wherein the number D is 2.

* * * * *